T868005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 731

778,096

COVERED ELASTIC YARN AND METHOD OF MAKING SAME

Salim M. Ibrahim, 2304 Riddle Ave., Wilmington, Del. 19806

Filed Nov. 22, 1968. Published Nov. 18, 1969

Int. Cl. D02g *3/36*

U.S. Cl. 57—152 6 Claims

1 Sheet Drawing. 15 Pages Specification

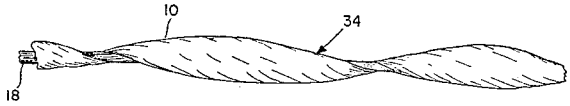

Figure 1:
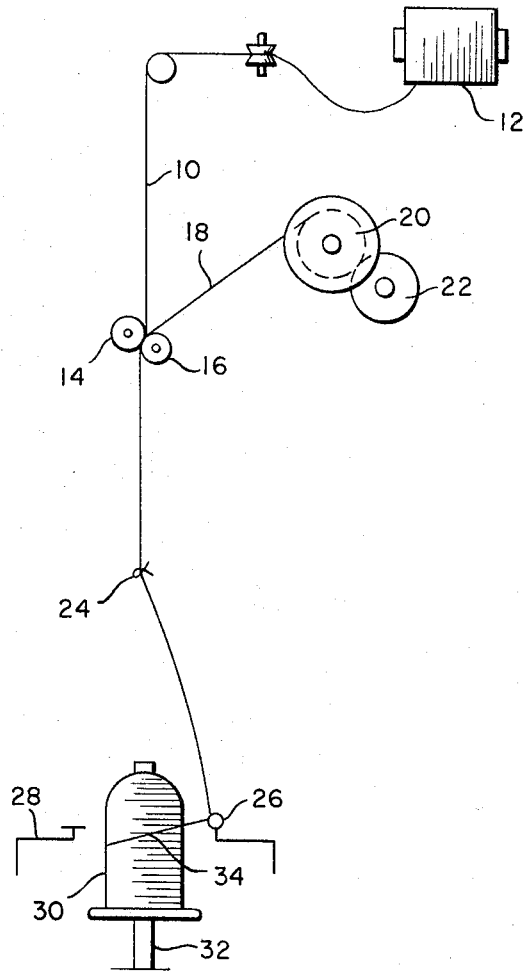
Figure 2:
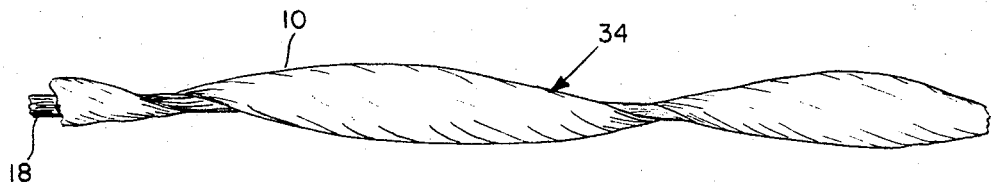

A process for plying one or more ends of a torque textured sheath yarn having a pseudo twist with an extended elastomeric core yarn wherein the ply twist applied is in the same direction as the pseudo twist of the torque textured yarn. When more than one end of sheath yarn is used the pseudo twist of the sheath yarns is in the same direction. The sheath filaments of the core-ply yarns of this invention are torque-textured thermoplastic yarns and may be polyamides, polyesters, polyolefins, or the like. The sheath yarn component may be of any convenient size, preferably in the range of from about 15 to about 200 denier, the denier per filament ranging from about 2 to about 5. The core yarn component is preferably spandex, and its denier is in the range of from about 20 to about 280. The spandex is extended from about 3× to about 5× depending on denier. The ply twist may range from about 10 to about 35 turns per inch for the heavy to the fine core-ply deniers respectively. The core-ply yarns are wound on conventional packages, i.e., using enough tension to maintain the yarn in a fully extended state. The process affords a twist-on-twist effect, thereby better utilizing the inherent characteristics of the torque-textured yarn. The core-plied yarns of this invention are unexpectedly better in cover, uniformity, and power than similar yarns known heretofore.

Nov. 18, 1969 S. M. IBRAHIM 778 096 T868005 DEF. PUB.

COVERED ELASTIC YARN AND METHOD OF MAKING SAME

Filed Nov. 22, 1968

INVENTOR
SALIM M. IBRAHIM

BY Howard P. West Jr.
ATTORNEY